United States Patent
Arndt et al.

[11] 3,757,613
[45] Sept. 11, 1973

[54] MULTIPLE SCREWING SYSTEM
[75] Inventors: Karl-Friedrich Arndt; Helmar Nafe, both of Essen, Germany
[73] Assignee: Fried Krupp Gesellschaft mit beschrankter Haftung, Essen, Germany
[22] Filed: Mar. 14, 1972
[21] Appl. No.: 234,526

[30] Foreign Application Priority Data
Mar. 17, 1971 Germany.................... P 21 12 907.7
Mar. 17, 1971 Germany.................... P 21 12 907.7

[52] U.S. Cl............................... 81/57.22, 81/52.4 R
[51] Int. Cl............................................. B25b 23/14
[58] Field of Search............... 81/57.22, 57.3, 57.31, 81/57.36, 52.4 R, 52.4 B

[56] References Cited
UNITED STATES PATENTS
3,319,494  5/1967  Ulbing............................. 81/57.22
2,964,152  12/1960  Banner............................. 81/57.36

Primary Examiner—James L. Jones, Jr.
Assistant Examiner—James G. Smith
Attorney—Walter Becker

[57] ABSTRACT

A multiple screwing system, in which each individual screwing device has helical spring means associated therewith which surrounds one end portion of the individual housing surrounding the pertaining screw spindle, said helical spring means having one end portion connected to said individual housing and having its other end portion connecting to frame means common to and surrounding the individual housings, while the bearings for the individual housings are journalled in elastic supporting means permitting a slight radial displacement of said individual housings.

4 Claims, 2 Drawing Figures

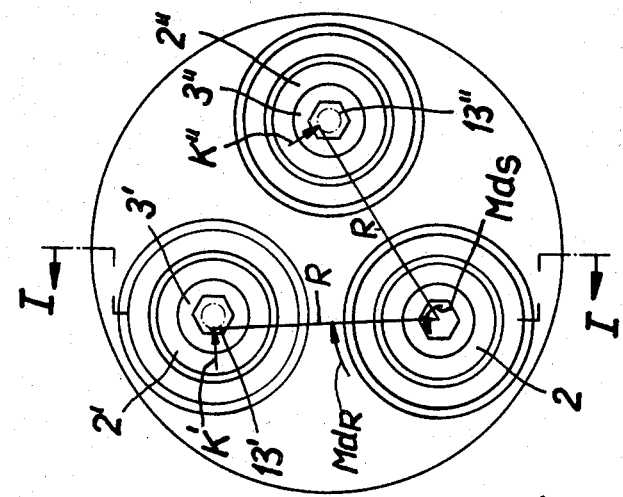
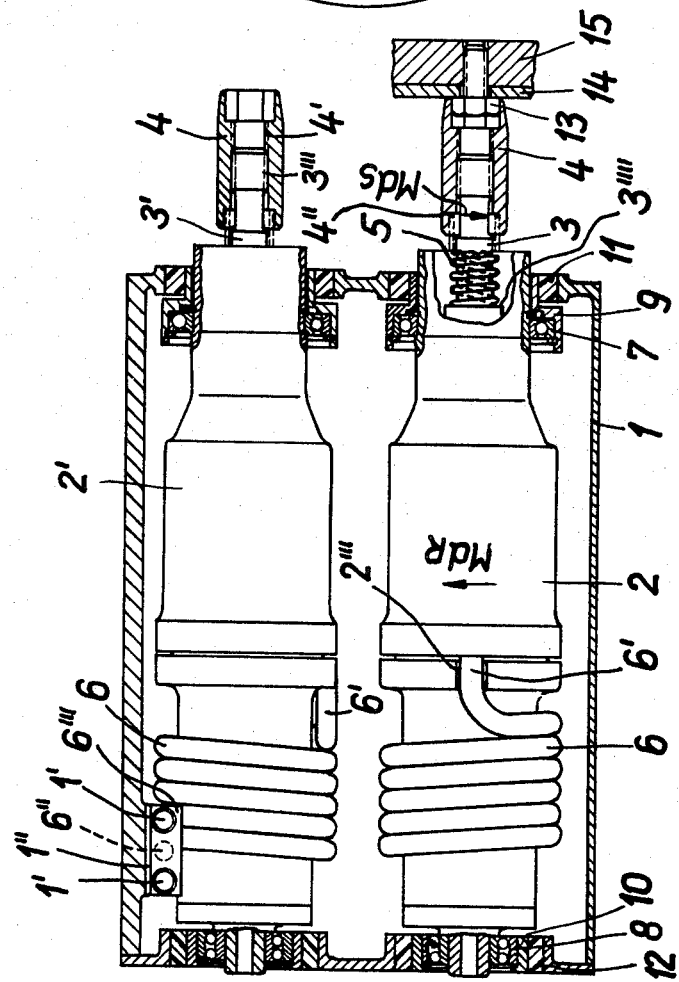

MULTIPLE SCREWING SYSTEM

The present invention relates to a multiple screwing system which comprises at least two individual screwing devices arranged in a common supporting frame while within the housing of each individual screwing device there is in a manner known per se arranged an electrically, pneumatically or hydraulically driven screw spindle.

Multiple screwing systems are employed in connection with the assembly of mass produced parts in order to economize the production. Within one working operation it is possible in this way to tighten more than twenty screws while the required time for this operation corresponds merely to the time required for tightening one single screw.

The heretofore employed multiple or multiple spindle screwing systems are characterized primarily in that the individual screw spindles which may be driven electrically, pneumatically or hydraulically are in radial direction rigidly journalled in a common guiding frame.

Furthermore, screw spindles have become known which are journalled in a frame in such a manner that they can slightly move relative to the frame in circumferential direction. This movement initiated by the reaction moment of the screw spindle is in cooperation with a measuring element employed for controling the torque conveyed to the screw spindle.

When tightening, for instance, nuts by means of a multiple screwing system, the reaction moment of each individual screwing device is absorbed by the frame and in the form of a radially effective reaction force is through the screw spindles conveyed to the nut to be tightened. Theoretically, with complete symmetry of the screwing arrangement and assuming the same conditions on the individual bolts and nuts, this reaction force should be the same.

Actually, however, the radial forces originating from the reaction moments are not equal so that, even with completely identical tightening moment of each screw spindle, different stresses occur in the screw connection.

It is, therefore, an object of the present invention, by equalizing the radial forces conveyed from the supporting frame to the individual screw spindles, to create equal tightening conditions for the screws or nuts to be tightened, and thereby to improve the precision of the preload in the screw connection.

This object and other objects and advantages of the invention will appear more clearly from the following specification in connection with the accompanying drawing, in which:

FIG. 1 is a longitudinal section through a multiple screwing system according to the invention, said section being taken along the line I — I of FIG. 2.

FIG. 2 is an end view of a spindle side of the multiple screwing system according to the invention, in other words, FIG. 2 is a view of FIG. 1 as seen in the direction of the arrow A.

The multiple screwing system according to the present invention is characterized primarily in that each screw spindle housing in the supporting frame is by means of two bearings, preferably antifriction bearings, rotatably arranged and rests against a helical spring which engages the circumference of the frame and is coaxial with the respective housing. The helical spring is arranged in the vicinity of that bearing which is remote from the pertaining screw spindle and there is connected to the supporting frame. The two bearings have their outer rings with the interposition of fitting parts rest in elastic annular members which may consist, for instance, of rubber or rubber-like material and which permit a slight radial displacement of the housings and thereby a displacement of the journalled screw spindles relative to the supporting frame.

Referring now to the drawing in detail, there are shown three individual screwing devices which are arranged in a common suporting frame 1. The housings of the individual screwing devices are designated with the reference numerals 2, 2' and 2'' respectively. These housings have journalled therein in a manner known per se screw spindles 3, 3' and 3'' respectively and have an electric, pneumatic or hydraulic drive.

The screw spindles 3, 3', 3'' respectively have a screw head 4, the so-called button die. Both parts are connected to each other by a key 3''', 4' respectively so as to be able together to be displaced axially. The screw heads 4 rest by means of a step 4'' against a cylindrical helical spring 5 which in its turn rests against a step 3'''' of the respective pertaining screw spindle and moves together with the latter.

The rear portion of each housing is surrounded by a cylindrical helical spring 6 which is connected to the circumference of the housing by means 6' and also to the supporting frame as shown at 6''.

Inasmuch as the drives for the screw spindles are respectively fixedly connected to the housing 2, 2', 2'' surrounding same it will be appreciated that a screw moment Mds exerted upon the respective screw spindle creates a reaction moment Mdr which, while being directed opposite to Mds, is of the same magnitude as Mds and tends to turn the pertaining housing 2, 2', 2'' about its longitudinal axis.

The reaction moment is conveyed to the supporting frame 1 through the intervention of helical spring 6. The respective helical spring 6 is connected to housing 2, 2', 2'' respectively by an arm 6' engaging a recess 2''' in the pertaining housing 2, 2', 2''. The other end 6'' of the helical spring 6 is connected to a plate 6''' which in its turn through screws or bolts 1' is nonmovably connected to a step 1'' of the supporting frame 1.

The elasticity brought about by spring 6 in circumferential direction between the individual screwing devices and the supporting frame prevents shock-like stresses of the rotating parts and thus protects above all the individual screwing devices against undue stresses and wear.

Depending on the magnitude of the screwing moment, the housings can turn in the antifriction bearings 7, 8 to a greater or smaller degree. The bearings 7 on the spindle side also absorb forces which act axially upon the spindle and the housing.

While, however, with heretofore known multiple screwing devices, the antifriction bearings 7, 8 are rigidly arranged in the supporting frame, according to the invention, the antifriction bearings 7, 8 are held in a fitting part 9, 10 which in its turn is mounted in an elastic annular part 11, 12 in the supporting frame.

The elastic annular parts are made of rubber or rubber-like material and permit a slight radial displacement of the housings 2, 2', 2'' and of the spindles 3, 3', 3'' in the supporting frame.

For purposes of explaining the action of the elastic annular parts, it is assumed that a torque Mds is in counter-clockwise direction conveyed by the screw spindle 3 to a screw 13 in order to interconnect the pieces 14 and 15. The torque Mds brings about a reaction moment Mdr which turns in clockwise direction and acts upon the supporting frame 1.

FIG. 2 shows the distribution of the reaction forces K' and K'' generated by the torque Mds onto the two other screw spindles 3', 3''. Under ideal conditions, these forces will be distributed uniformly onto the said screw spindles and thereby also onto the screws to be tightened 13', 13'' : $K' = K'' = 0.5 \cdot Mdr/R$, R being the distance between the central axes of screws 13' and 13'' from the central axis of screw 13.

The reaction moment turning in clockwise direction is absorbed by screws 13' and 13'' at the distance R. Mathematically, therefore, the reaction moment can be replaced by the forces K' and K'' so that the following formula may be established: $Mdr = (K' + K'') \times R =$ (under ideal conditions) $2K' \times R = 2K'' \times R''$.

In view of the prevailing tolerances of the individual screwing devices and the parts to be connected and in view of the play inherent thereto, actually a non-uniform distribution of the reaction forces occurs. For instance, the total reaction moment Mdr may as a radially effective reaction force act upon screw 13' so that the third screw 13'' is radially completely free from load. Consequently, these two screws are tightened under completely different conditions. Such non-uniform distribution of the forces is prevented by the provision of the elastic annular parts in conformity with the invention. The individual screwing devices are able slightly to move in radial direction relative to the supporting frame so that during the screwing operation always two spindles or screws will absorb the reaction force created by the third screw spindle. The screws 13', 13'' are thus tightened under approximately equal conditions.

A differently high radial load on the screws will, in view of the not equal screwing-in resistance caused by the scews, even with equal screwing moments cause a non-equal preload.

The equalization of the reaction forces conveyed from the supporting frame to the individual screw spindles thus brings about that the precision of the preload in the screw connection is greatly improved by the installation of the elastic annular parts.

It is, of course, to be understood that the present invention is, by no means, limited to the particular showing in the drawing but also comprises any modifications within the scope of the appended claims.

What we claim is:

1. A multiple screwing system, which includes: at least two individual screwing devices; supporting frame means common to and housing said individual screwing devices; each of said individual screwing devices comprising a housing, a screw spindle rotatably journalled within said housing, and means for driving said spindle; bearing means respectively associated with the end portions of each of said housings for rotatably supporting said housings; a plurality of helical spring means respectively associated with said housings and substantially coaxially surrounding the same; each of said spring means having one end portion connected to said supporting frame means and the other end portion connected to the pertaining housing; and supporting means of elastomeric material respectively mounted in said supporting frame means and supporting said bearing means to thereby permit a limited slight radial displacement of said housings and of said screw spindles relative to said supporting frame means.

2. A multiple screwing system according to claim 1, in which said elastomeric material consists of elastic rubber material.

3. A multiple screwing system according to claim 1, in which each screw spindle at one end portion thereof has connected thereto a screw head, and in which said helical spring means are respectively arranged at that end of the pertaining housing which is remote from the pertaining screw head.

4. A multiple screwing system according to claim 1, which includes fitting means interposed between said bearing means and said supporting means of elastomeric material.

* * * * *